US011189119B2

(12) United States Patent
Jarugumilli et al.

(10) Patent No.: US 11,189,119 B2
(45) Date of Patent: Nov. 30, 2021

(54) METHOD AND SYSTEM FOR ACCESS SYSTEMS

(71) Applicant: Carrier Corporation, Palm Beach Gardens, FL (US)

(72) Inventors: Krishnakanth Jarugumilli, Telangana (IN); Mahesh Dhumpeti, Telangana (IN); Gokul Ellanki, Telangana (IN); Anil Kumar Varturi, Telangana (IN); Rajesh Krishna Etikela, Telangana (IN); Sriram Narasimha Murthy Dulam, Telangana (IN); Michael R. Green, New York, NY (US); Kishore Maroju, Telangana (IN); Ashley Kennedy-Foster, Henrietta, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/926,266

(22) Filed: Jul. 10, 2020

(65) Prior Publication Data

US 2021/0019966 A1  Jan. 21, 2021

(30) Foreign Application Priority Data

Jul. 19, 2019  (IN) ............................. 201911029214

(51) Int. Cl.
*G07C 9/00* (2020.01)
*H04W 4/02* (2018.01)
*H04B 17/318* (2015.01)
*H04W 4/80* (2018.01)
*H04W 88/02* (2009.01)

(52) U.S. Cl.
CPC ....... *G07C 9/00309* (2013.01); *H04B 17/318* (2015.01); *H04W 4/023* (2013.01); *H04W 4/80* (2018.02); *H04W 88/02* (2013.01)

(58) Field of Classification Search
None
See application file for complete search history.

(56) References Cited

U.S. PATENT DOCUMENTS 5,661,286 A   8/1997 Fujioka
8,400,269 B2  3/2013 Tuttle
(Continued)

FOREIGN PATENT DOCUMENTS

CN   104103111 A   10/2014
CN   105809777 A   7/2016
(Continued)

OTHER PUBLICATIONS

Notice of Allowance for U.S. Appl. No. 16/934,302; dated Apr. 2, 2021; 25, Pages.

*Primary Examiner* — Thomas S McCormack
(74) *Attorney, Agent, or Firm* — Cantor Colburn LLP

(57) ABSTRACT

Aspects of the invention are directed towards method system and devices assisting a user in providing seamless access to a user through an access point of the access system. The invention describes estimating various factors such as time, distance, and signal strength enabling frictionless access to the user. The invention describes adjusting the time interval and the signal strength according to the needs of the user. Various other embodiments of the invention describes estimating a threshold signal strength and time interval based on a distance of the user from the access point.

20 Claims, 3 Drawing Sheets

(56) References Cited

U.S. PATENT DOCUMENTS

| | | |
|---|---|---|
| 9,196,104 B2 | 11/2015 | Dumas et al. |
| 9,311,656 B2 | 4/2016 | Barnes, Jr. |
| 9,336,637 B2 | 5/2016 | Neil et al. |
| 9,384,608 B2 * | 7/2016 | Strulovitch ............... G07C 9/22 |
| 9,443,365 B2 | 9/2016 | Ahearn et al. |
| 9,483,887 B1 | 11/2016 | Soleimani |
| 9,697,661 B1 | 7/2017 | Dumas et al. |
| 9,704,314 B2 | 7/2017 | Johnson et al. |
| 9,916,746 B2 | 3/2018 | Johnson et al. |
| 9,940,490 B1 | 4/2018 | Robshaw et al. |
| 10,089,807 B2 | 10/2018 | Pluss et al. |
| 10,096,185 B2 | 10/2018 | Pluss et al. |
| 10,186,095 B2 * | 1/2019 | Dehnert ................ H04L 63/102 |
| 10,198,884 B2 | 2/2019 | Johnson |
| 10,249,122 B1 * | 4/2019 | Aksamit ................. G01S 11/06 |
| 2006/0136997 A1 * | 6/2006 | Telek ...................... G01S 11/06 726/5 |
| 2010/0075656 A1 * | 3/2010 | Howarter ............ B60R 25/2009 455/420 |
| 2010/0148918 A1 | 6/2010 | Gerner et al. |
| 2012/0092129 A1 * | 4/2012 | Lickfelt .................. B60R 25/24 340/5.72 |
| 2013/0027180 A1 | 1/2013 | Lakamraju et al. |
| 2015/0048927 A1 | 2/2015 | Simmons |
| 2015/0199859 A1 | 7/2015 | Ouyang et al. |
| 2017/0301166 A1 * | 10/2017 | Earles ..................... G06F 21/35 |
| 2019/0019365 A1 | 1/2019 | Lee |
| 2020/0168017 A1 * | 5/2020 | Prostko .............. G07C 9/00563 |
| 2020/0351661 A1 * | 11/2020 | Kuenzi .............. G06Q 30/0267 |
| 2021/0027562 A1 | 1/2021 | Kennedy-Foster |

FOREIGN PATENT DOCUMENTS

| | | |
|---|---|---|
| CN | 106981108 A | 7/2017 |
| CN | 107103673 A | 8/2017 |
| CN | 108230504 A | 6/2018 |
| WO | 2018025086 A1 | 2/2018 |
| WO | 2019039746 A1 | 2/2019 |

\* cited by examiner

METHOD AND SYSTEM FOR ACCESS SYSTEMS

FOREIGN PRIORITY

This application claims priority to Indian Patent Application No. 201911029214, filed Jul. 19, 2019, and all the benefits accruing therefrom under 35 U.S.C. § 119, the contents of which in its entirety are herein incorporated by reference.

TECHNICAL FIELD OF INVENTION

The present invention relates generally to security systems. More particularly, the invention relates to an apparatus and method for providing seamless access to the user through an access control system.

BACKGROUND OF THE INVENTION

In an Access Control System, the doors may contain Bluetooth enabled devices/readers. Users are generally issued a Radio Frequency Identification (RFID) card which is placed on the Bluetooth reader in order to open the door. The RFID card can be replaced by a mobile application. The mobile application can send user credentials from the mobile device using the built-in Bluetooth hardware. But, the user needs to be present at a specific distance from the Bluetooth enabled device in order to access it. More often than not, it is tedious to accurately identify the specific distance.

Moreover, when dealing with seamless digital credentials and access, in order to have the best experience, users need to understand Bluetooth signal strength and also guess the strength required to give them enough time to pass through the door or an entrance. The Bluetooth signal strength needs to take into account of interference like a book bag, pocket, or a corner wall that affects the signal strength. In order to fine tune the experience, users mostly revisit the configuration user interface to adjust signal strength to get the desired state for seamless access. Revisiting the user interface to make adjustments is troublesome. More troublesome is the fact that this procedure needs to be repeated for each and every door or access point.

The access control systems enabled with Bluetooth readers are also dependent on appropriate signal strength required for establishing communication between the mobile device and the access control system. The signal strength increases as the proximity of the mobile device with the access control system decreases. Thus, the signal strength is required to be considered for providing seamless access to the users.

Therefore, there is a need in the art to develop methods and systems for providing mechanisms to seamlessly access the access control systems without any friction.

SUMMARY OF THE INVENTION

Various embodiments of the invention describe a method of providing seamless access to a user of a user terminal. The method describes placing the user terminal at a distance from an access system. A threshold signal strength and time interval for accessing the access system are estimated based on the distance. The method describes receiving a user input on the user terminal based on the estimation. A registration request for the registering the user terminal is initiated and sent to the access system. Subsequently, the user terminal is registered by the access system based on the distance, time interval and the threshold signal strength.

In an embodiment of the invention, the user terminal sends an access request to the access system for validation thereby providing or denying access to a user of the user terminal inside the access point.

In yet another embodiment of the invention the access request is automatically sent to the access system for validation on detecting the distance and the threshold signal strength.

In another embodiment of the invention the estimation of the signal strength and the time interval along with the distance are determined using a user application on the user terminal. The receiving of the user input and sending the registration request are executed by the user application.

In still another embodiment of the invention the user application on the user terminal is configured to store user credentials for the access request for accessing multiple access points.

In another embodiment of the invention the registration request includes estimated signal strength and time interval along with the distance. The registration request further includes user credentials.

In another embodiment of the invention the time interval represents a duration between sending the user credentials to access the access system and activating the access system for opening an access associated with the access system.

In still another embodiment of the invention the distance and the time interval are adjusted by the access system based on an updated threshold signal strength.

In another embodiment of the invention, the distance and the time interval are adjusted by the access system based an adjustment request from the user.

In yet another embodiment of the invention the distance and the time interval are adjusted automatically by the access system based on a usage pattern of the user accessing the access system.

In another embodiment of the invention, the access point comprises a communication module which is compatible with the communication unit of the user terminal, wherein the communication module can be a Bluetooth module, a Wi-Fi module, or a ZigBee module.

In still another embodiment of the access point and the user terminal are communicably coupled to an access control unit.

In another embodiment of the invention the threshold signal strength is represented by a Received Signal Strength Indicator (RSSI) value for communication between the user terminal and the access system.

In yet another embodiment of the invention a system is disclosed comprising a user terminal and an access system. The user terminal is configured to estimate a threshold signal strength and time interval for accessing an access system based on a distance. The user terminal is placed at the distance from the access system. Based on the estimation a user input is received on the user terminal to initiate a registration request. The registration request is sent to the access system to register the user terminal for accessing based on the distance, time interval, and the threshold signal strength. The access system comprises an access point, an access control unit, and a controller for receiving the registration request from the user terminal and registering the user terminal to access an access associated with the access system based on the distance, time interval, and the threshold signal strength.

In another embodiment of the invention the access control unit comprises a credential server for storing data related to the user credentials for validation of an access request and a database for storing details of the access requests by the users on the access system.

In yet another embodiment of the invention, the distance and the time interval can be adjusted by the access system based on an updated threshold signal strength.

In another embodiment of the invention the time interval is adjusted automatically by the access system based on a usage pattern by the user of the user terminal to access the access system.

In still another embodiment of the invention, the access point comprises a communication module which is compatible with the communication unit of the user terminal, wherein the communication module can be a Bluetooth module, Wi-Fi module, or a ZigBee module.

In another embodiment of the invention, the access system receives user credentials automatically from the user terminal for validation thereby providing or denying access to a user of the user terminal.

In various other embodiments of the invention a computer readable medium is disclosed comprising one or more processors and a memory coupled to the one or more processors. The memory stores instructions which are executed by the one or more processors to estimate a threshold signal strength and time interval for accessing an access point of an access system based on a distance. A user terminal is placed at the distance from the access point. The processor is configured to receive a user input on the user terminal based on estimation. The processor is further configured to send a registration request from the user terminal to the access system. The access system registers a user of the user terminal based on the distance, time interval, and the threshold signal strength.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
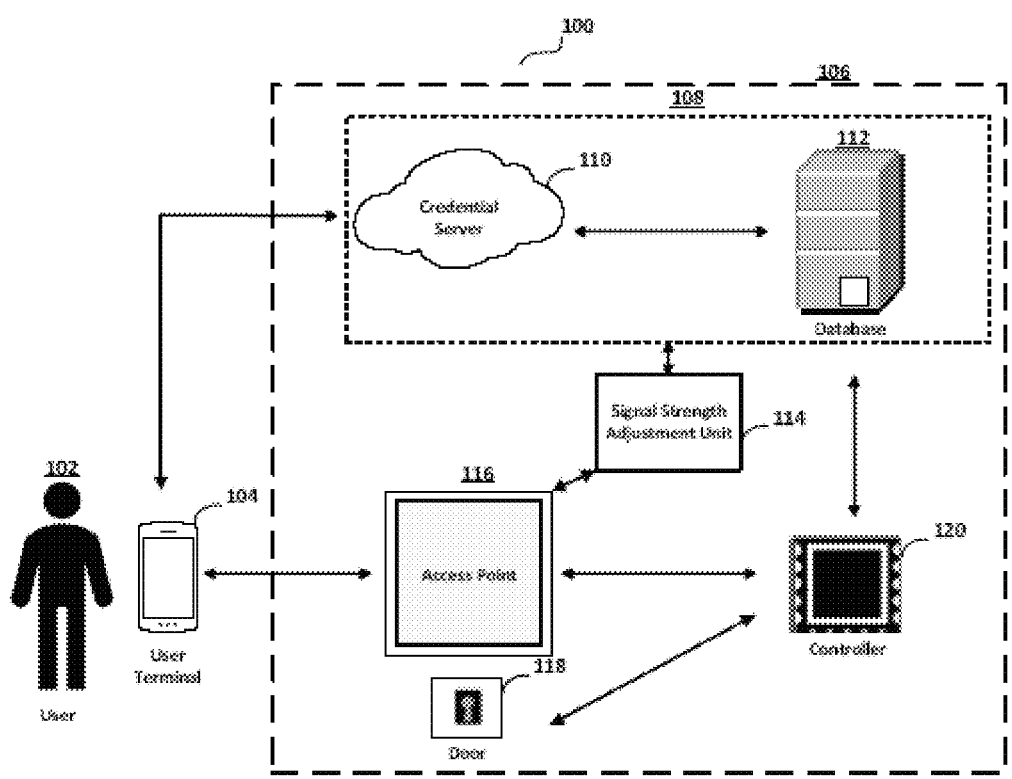
FIG. 1 is an exemplary diagram illustrating status of interaction between a user terminal and an entrance in accordance with an embodiment of the invention.

Described herein is the technology with systems, methods, and devices for seamless access to a user in the premises using electronic security control systems such as offices, homes, hotels and the like.

Various embodiments of the invention further describe a method for providing seamless entry inside the premises to a user by registering a user terminal for distance time interval, and a threshold signal strength. The invention describes using a user terminal with a user application as a badge/access card to gain entry inside the premises. The invention describes placing the user terminal at a distance from an access point of the access system. The access point is able to communicate with the user terminal for providing entry inside the premises to the user of the user terminal. The access point may include a communication module such as a Bluetooth module, a Wi-Fi module, or a Zigbee module. The communication module is compatible with a communication unit of the user terminal.

After placing the user terminal at the distance, the access system may estimate a threshold signal strength and a time interval for a given distance. The distance denotes the actual distance in S.I. units between the user terminal and the access point. The interval may be a default time set by an administrator of the access system for a given distance. The estimated time interval may be dependent on the distance between the user terminal and the access point. At a particular distance, the user terminal may estimate the signal strength and the time interval. Subsequently the user may initiate a request to register the signal strength as a "threshold signal strength." At the same time, the request may include the distance and the time interval configured along with the threshold signal strength. The request is sent to the access system via communication channel. On receiving the registration request, the access system may register the user of the user terminal for accessing the access point based on the distance, time interval and the threshold signal strength.

The time interval estimated based on the distance may not be adequate for the user accessing the access point. For example, access may have been granted and then rescinded by the time user reaches the access point. On the other hand, the access point may interfere with the free movement of the user from the same distance and the threshold signal strength when the access point just about to get closed when the user is trying to enter inside the access point. In such a case, the access system may adjust the time interval without changing the distance and the threshold signal strength.

As an another case, the time interval may be too long and the access may be susceptible to tailgating. In such a case, the access system may change the distance (say, 1.5 meters) and the threshold signal strength (−30 dB) for the same time interval. Thus, the user may have just adequate time interval to pass through the access point.

In another scenario, the user may not be able to achieve the threshold signal strength from the same distance (for example, due to interference or other factors). For example, the registered distance is 1 meter. However, due to the interference, threshold signal strength (−20 dB) is not achieved. In such case, the access system may automatically change the distance (say, 0.5 meter) and the time interval (say, 3 seconds) such that the same threshold signal strength (−20 dB) is achieved.

The user terminal may already have a user credentials for accessing the premises before sending the registration request or the user credentials may be received after registering the user terminal. The user credentials are stored in a memory of the user terminal and can be accessed by the user application for an access request with the access system. The user credentials may be part of the user request for accessing the access point of the access system. The access request may be sent automatically to the access system after detection of the threshold signal strength and distance by the access system. The access system is configured to validate the user credentials and thereby providing or denying access to a user of the user terminal inside the premises. The user application on the user terminal may be configured to estimate the signal strength and the time interval which the user require to access the access system. The user application may also be configured to send registration request based on a user input to register the user of the user terminal with the access system. The registration request may include the estimated signal strength, time interval, and the distance. Moreover, the user credentials may also be part of the registration request.

In an embodiment of the invention, the registration of the user terminal for accessing the entry may be performed by a user application. The user application may prompt for adjusting the user to a specific distance and hold the user terminal. A time interval may be estimated by the access system for the specified distance and may be available for the user to edit the same according to his/her needs. The user application may also display the signal strength indicator to the user of the user terminal. The user may subsequently initiate the request to register the user of the user terminal for the specific distance, time interval, and signal strength. The time interval may represent a duration between sending the user credentials to access the access system and activating the access system for opening an entrance associated with the access system. The registration may be initiated using a button, voice command, or through user interface elements provided by the user application and known to a skilled in the art. The access system may receive the request and may take some time (say 5-10 seconds) to register the user terminal for accessing the access system.

In another embodiment of the invention, the user application may be associated with user preferences such as notification services. The notification service may be operated by the access control unit of the access system. For example, the notification service may notify the user of a particular access along with name of entrance and the time stamp related to opening of an access or entrance. Similarly, the notification service may notify the user terminal with a request from the access system to modify the distance and the time interval for accessing the access system. The user may then submit an input to change the distance and time interval, if any. The changes may be sent to the access system, accordingly, the changes in the distance and time interval would be registered. Likewise, the preferences may include settings for sensitivity where the user can modify the time interval, distance, and signal strength and register the updated changes with the access system. Further, the preference may display various paths for the user to reach a specific location inside the premises. The user application may also provide preference to activate or deactivate the access using the user terminal. The preferences may also use selecting the entrances for using the user terminal to gain access inside. Other preferences can also be provided and are within the scope of the invention.

Various other embodiments the invention discloses a system comprising a user terminal and an access system. The user terminal may be configured to estimate a threshold signal strength and time interval for accessing the access system based on a distance. The user terminal may be placed at the distance from the access system. The user terminal receives a user input based on the estimation. If the user of the user terminal is satisfied with the threshold signal strength and the time interval from the distance, the user may send a request to the access system for registering the user of the user terminal to access the access system based on the threshold signal strength and time interval from the particular distance. The registration request is received by the access system using a communication module. The access system registers the user terminal for the threshold signal strength and the time interval for the specific distance.

After registration, when the user of the user terminal wants to access an access point of the access system from the specific distance, the user terminal on detecting the registered threshold signal strength from the specific distance will send an access request to the access system automatically. Based on the validation, the entry to the user is granted and the entrance associated with the access system gets opened for the user. The time interval represents the time provided for the access request to be transmitted from the user terminal to the access point of the access system, validation of the access request, opening of the entrance after validation, and further time for which the entrance remains open. In another embodiment, the time interval can represent the time for which the entrance remains open.

In an embodiment of the invention, the distance and the time interval are adjusted by the access system based on an updated threshold signal strength. The updated signal strength can be initiated by the user or it can be automatically set by the access system.

In an embodiment of the invention, distance and time interval can also be modified by the user and accordingly, the threshold signal strength may change. Moreover, the change in distance and time interval can be automatically set by the access system based on the regular usage pattern of the user.

In one embodiment of the invention, the threshold signal strength may represent the Received Signal Strength Indicator (RSSI) value for communication between the user terminal and the access system.

Turning now to figures, FIG. 1 depicts the components to access the access system by estimating a threshold signal strength and time interval from a specified distance. When the user (102) with the user terminal (104) approaches an access point (116) with the communication module of the access system, the user terminal detects the threshold signal strength from the distance registered by the user. On sensing the signal strength, the access request is transmitted from the user terminal (104) to the credential server (110) of the access control unit (108) via the access point (116). The access request is then validated by an access control unit (108). The access control unit may include the credential server (110) and a database (112). The access request may include user credentials, unique code and the like. The user credentials can be sent directly to the credential server (110). The credential server and the database can validate the user credentials and/or the access request. Once the access request is validated, the database (112) may actuate the controller (120) to open the door (118) and provide access to the user (102). The access control unit (108) may provide instructions to the controller (120) to issue an actuation command. The credential server (110) and the database (112) can be a single entity which is within the scope of the invention. The access system (106) allows the user to access the door (118) within the time interval which is registered by the access system after registration.

Figure 2:
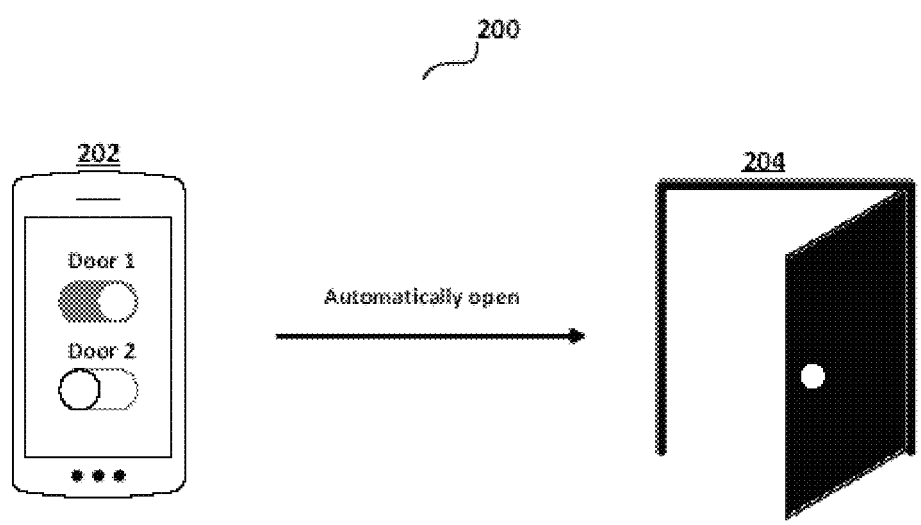
FIG. 2 is an exemplary diagram illustrating a system in accordance with an embodiment of the invention.

FIG. 2 depicts the opening of the door (204) when the user terminal (202) is within configurable distance of the access system (100) and with a threshold signal strength. On detection of the threshold signal strength the user terminal (202) sends the user credentials to the access system (100). As the user credentials are transmitted to the access system, they are validated and the door (204) is actuated to open and provide access to the user through the door. It is noted that the door is associated with the access point of the access system for opening and closing of the door.

Figure 3:
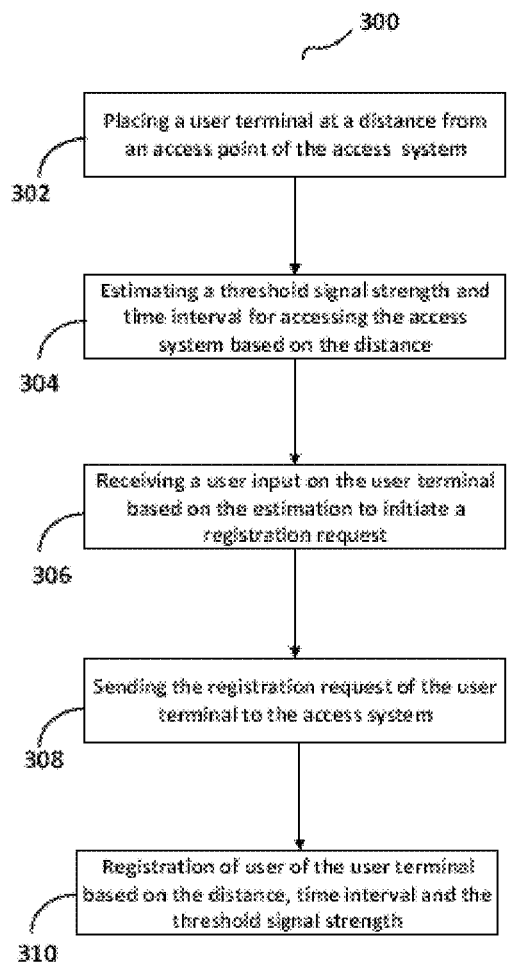
FIG. 3 is an exemplary flowchart depicting different steps to enable the invention according to an embodiment of the invention.

FIG. 3 depicts a flowchart outlining the features of the invention in an embodiment of the invention. The flowchart (300) describes a method to register the user of the user terminal to access the premises from a distance from an access point of an access system. The method starts at (302) by placing a user terminal at a distance from the access system. A threshold signal strength is estimated (304) by the user terminal. A user input is received (306) on the user terminal based on the estimation of the signal strength and the time interval. A registration request is sent to the access system for registering the user of the user terminal to the access system (308) from the distance and within the time interval. The user is registered based on distance, time interval, and the threshold signal strength (310).

Another embodiment of the invention discloses a computer readable medium comprising one or more processors and a memory coupled to the one or more processors, the memory storing instructions which are executed by the one or more processors, the one or more processors are operable to estimate a threshold signal strength and time interval for accessing the access system based on a distance. Initially, the user terminal is placed at a distance from an access point of the access system for estimation. After estimation of the signal strength, the processor is configured to receive input from the user of the user terminal. Based on the user input, the processor is configured to send a registration request for a user of the user terminal. Subsequently, the access system registers the user for accessing an access point of the access system based on registered threshold signal strength and the time interval for a given distance. The registration request includes user credentials along with the distance, time interval, and the threshold signal strength.

The various embodiments of the invention described herein can be combined and performed together to enable the invention which is within the scope of the invention.

The invention provides various advantages of seamlessly access the access systems such as entrances, doors etc. with automated security. The invention provides a frictionless and adaptable approach to access the security system. The user can adjust the distance and time required for contactless entry without even showing the access device at any access point.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

Further reference to any content has been made throughout the specification and words and phrases such as "user device", "user terminal", "mobile terminal", "mobile phone", or the like have been interchangeably used and means the handheld device for installing the configuration for all the devices in the system. Moreover, the words and phrases like "cloud", "server", "cloud server" and "database" or the like have been interchangeably used which means a storage location located remotely for storing configuration and configuration updates for all the devices in the system. Further words and phrases like, "doors", "entrances" or access point or the like have been interchangeably used which means access points associated with the doors and entrances to provide access inside the entrances or doors.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for accessing an access system, the method comprising:
placing a user terminal at a distance from an access point of the access system;
estimating a threshold signal strength and time interval for accessing the access system based on the distance;
receiving a user input on the user terminal based on the estimation to initiate a registration request; and
sending the registration request to the access system,
wherein the access system registers a user of the user terminal based on the distance, time interval and the threshold signal strength.

2. The method of claim 1, wherein the user terminal sends an access request to the access system for validation thereby providing or denying access to a user of the user terminal inside the access point.

3. The method of claim 2, wherein the access request is automatically sent to the access system for validation on detecting the distance and the threshold signal strength.

4. The method of claim 1, wherein the estimation of the signal strength and the time interval along with the distance are determined using a user application on the user terminal, wherein the receiving of the user input and sending the registration request are executed by the user application.

5. The method of claim 4, wherein the user application on the user terminal is configured to store user credentials for the access request for accessing multiple access points.

6. The method of claim 5, wherein the registration request includes estimated signal strength and time interval along with the distance, wherein the registration request further includes the user credentials.

7. The method of claim 2, wherein the time interval represents a duration between sending the access request to access the access system and activating the access system for opening an access point associated with the access system.

8. The method of claim 1, wherein the distance and the time interval are adjusted by the access system based on an updated threshold signal strength.

9. The method of claim 1, wherein the distance and the time interval are adjusted by the access system based on an adjustment request from the user.

10. The method of claim 1, wherein the distance and the time interval are adjusted automatically by the access system based on a usage pattern of the user accessing the access system.

11. The method of claim 1, wherein the access point comprises a communication module which is compatible with the communication unit of the user terminal, wherein the communication module can be a Bluetooth module, a Wi-Fi module, or a Zigbee module.

12. The method of claim 1, wherein the access point and the user terminal are communicably coupled to an access control unit.

13. The method of claim 1, wherein the threshold signal strength is represented by a Received Signal Strength Indicator (RSSI) value for communication between the user terminal and the access system.

14. A system comprising:
a user terminal configured to:
estimate a threshold signal strength and time interval for accessing an access system based on a distance, wherein the user terminal is placed at the distance from the access system;
receive a user input on the user terminal based on estimation to initiate a registration request; and
sending the registration request to the access system,
the access system comprising an access point, an access control unit, and a controller, wherein the access system is configured to:
receive the registration request from the user terminal; and
register a user of the user terminal to access an access associated with the access system based on the distance, time interval, and the threshold signal strength.

15. The system of claim 14, wherein the access control unit comprises:
a credential server for storing data related to user credentials for validation of an access request;
a database for storing details of the access requests by the users on the access system.

16. The system of claim 14, wherein the distance and the time interval can be adjusted by the access system based on an updated threshold signal strength.

17. The system of claim 14, wherein the time interval is adjusted automatically by the access system based on a usage pattern by the user of the user terminal to access the access system.

18. The system of claim 14, wherein the access point comprises a communication module which is compatible with the communication unit of the user terminal, wherein the communication module can be a Bluetooth module, Wi-Fi module, or a Zigbee module.

19. The system of claim 15, wherein the access system receives the access request automatically from the user terminal for validation thereby providing or denying access to a user of the user terminal.

20. A non-transitory computer readable medium comprising one or more processors and a memory coupled to the one or more processors, the memory storing instructions which are executed by the one or more processors, the one or more processors configured to:
estimating a threshold signal strength and time interval for accessing an access system based on a distance, wherein a user terminal is placed at the distance from an access point of the access system;
receiving a user input on the user terminal based on the estimation to initiate a registration request; and
sending the registration request to the access system,
wherein the access system registers a user of the user terminal based on the distance, time interval and the threshold signal strength.

* * * * *